July 26, 1938.  J. MIHALYI  2,124,885
FOCUSING MECHANISM FOR INTERCHANGEABLE LENSES
Filed Aug. 11, 1936

INVENTOR.
Joseph Mihalyi
BY
ATTORNEYS

Patented July 26, 1938

2,124,885

UNITED STATES PATENT OFFICE 2,124,885

FOCUSING MECHANISM FOR INTERCHANGEABLE LENSES

Joseph Mihalyi, Rochester, N. Y., assignor, by mesne assignments, to Eastman Kodak Company, Jersey City, N. J., a corporation of New Jersey Application August 11, 1936, Serial No. 95,375

2 Claims. (Cl. 95—45)

My present invention relates to photographic apparatus, and particularly to photographic cameras adapted to employ interchangeable lenses differing in focal length and provided with range finders coupled to the focusing adjustment of such objectives, so that the camera objective is always focused on objects spaced at the distance for which the range finder is set.

In cameras adapted to employ interchangeable lenses differing in focal length, it is difficult to provide a range finder which will be properly coupled to each of the several lenses, so that the setting of the range finder will always correspond exactly with the focusing adjustment of each of the individual lenses.

It is an object of my present invention to provide for such cameras a range finder coupling which is so constructed and arranged that the focusing adjustment of each of a number of lenses will always correspondingly adjust the setting of the range finder.

Another object of my invention is the provision of a range finder structure adapted to cooperate with different lenses, so that the full focusing movement of the lens, regardless of its focal length, will impart to the range finder the same amount of adjustment.

Another object of my invention is to provide a camera adapted to employ interchangeable lenses in which each lens is itself provided with a focusing construction proper for its individual focal length, so that its focusing movement will be transmitted to the range finder on a proper scale.

Other objects and advantages of my invention will be apparent from the following description when read in connection with the accompanying drawing, and its scope will be pointed out in the appended claims.

Figure 1:
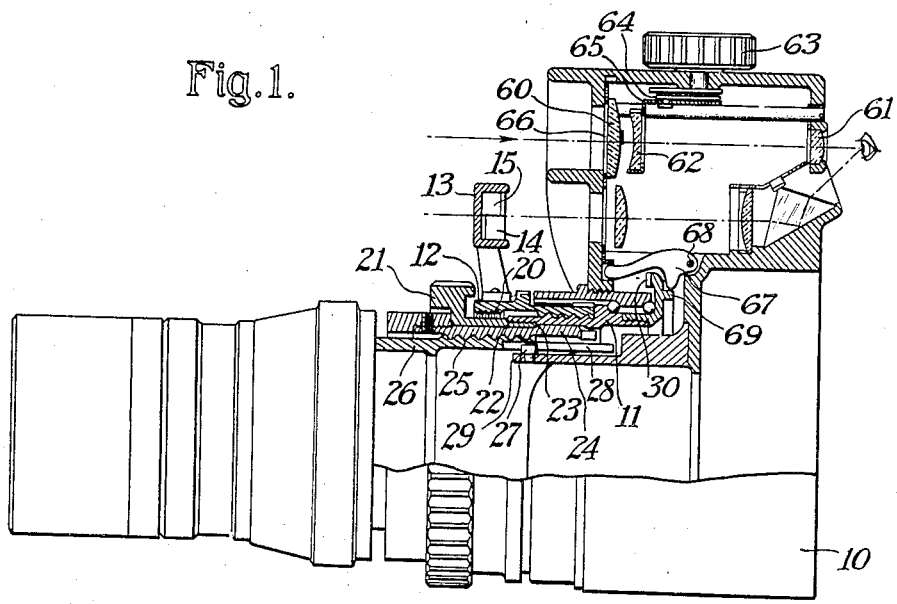
Fig. 1 is a view partly in section of a camera incorporating my invention.
Figure 2:
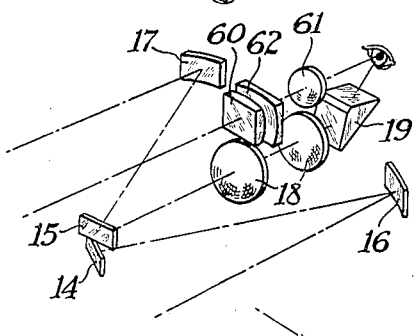
Fig. 2 is a view in perspective showing the optical parts of the range and view finders.

In the structural arrangement shown in Fig. 1, a camera 10 is provided with a rotatable focusing sleeve 11 on which is permanently mounted, by a suitable screw-threaded engagement, a non-rotatable but axially movable member 12, on which is rigidly mounted an upright standard 13 in which are mounted two mirrors 14 and 15 which form the movable part of the range finder system with which the camera 10 is provided. The essential optical elements of this range finder system are shown in Fig. 2 as comprising two spaced concave reflectors 16 and 17 mounted on the camera to form the base of the range finder system. These two reflectors 16 and 17 have a focal length which is equal to that of the standard lens which normally will be provided with the camera, and in the focal plane of these reflectors 16 and 17 are mounted the two beam-splitting mirrors 14 and 15, as above described. The two mirrors 14 and 15 direct the light received from the reflectors 16 and 17 along a common axis, on which is positioned an ocular comprising lenses 18 which have a focal length substantially equal to their distance from their beam-splitting mirrors 14 and 15. Behind the ocular 18 is positioned a prism 19 which directs the image seen through the ocular 18 and also directs it at the proper angle for striking the eye of an observer when his eye is positioned for observing the field through the view finder, as will be described below.

The focal length of the beam accepting reflectors 16 and 17 is made equal to the focal length of the normal objective, which is secured to screw threads 20 provided in the non-rotatable sleeve 12, so that in focusing the normal lens, its axial movement is imparted directly to the beam-splitting mirrors 14 and 15, since they are rigidly secured to the non-rotatable sleeve 12. This arrangement to assure that the range finder will always correctly indicate the distance for which the normal objective is focused is fully disclosed in my copending application Serial Number 95,374 filed concurrently herewith.

The range and view finder arrangement illustrated in Figs. 1 and 2 is fully disclosed and claimed in my above identified copending application and is referred to here merely for convenience. As stated above, the range finder is of the split field coincidence type employing two spaced concave reflectors 16 and 17 mounted on the camera to form the base of the system. These reflectors 16 and 17 preferably have a focal length equal to that of the standard lens in the camera and in their focal plane are mounted on the beam splitting or dividing mirrors 14 and 15 which direct the light collected by the reflectors 16 and 17 along the axis of the eyepiece or ocular 18. The erecting prism 19 positioned in the parallel beam of the ocular 18 serves to direct the range finder beam to the eye when in position to use the view finder which will now be described.

The view finder may be of any suitable type but I prefer to employ one of variable power as described and claimed in my Patent Number 2,043,900 which issued June 9, 1936 and to mount it, as shown, immediately over the range finder system so that its eyepiece or observation opening and that of the range finder are adjacent whereby a slight angular movement of the eye of the observer is all that is necessary to shift from the range finder to the view finder system. The view finder system comprises a front positive lens 60, a rear eyelet lens 61 and a negative field lens 62 behind the front lens 60. The angular field of the view finder is adjusted to correspond with the focal length of the camera objective by shifting the field lens along its axis by means of a rotatable knob 63 through a cam 64 and a swinging arm 65. The positive front lens 60 is mounted in a bracket 66 whose lower end engages the end of a lever 67 pivoted at 68. A cammed ring 69 formed on the rotatable focusing sleeve 11 engages the lever 67 to shift the lens 60 up and down in coordination with the focusing of the camera lens so as to compensate for parallax in the view finder.

For accommodating other lenses of different focal length, the normal lens is removed from its screw-threaded mounting 20 and the auxiliary lens is inserted within the rotatable sleeve 11 and secured thereto by a ring 21 which is screwed into threads 22 provided on the sleeve 11 and abuts against a shoulder 23 provided on the sleeve 24 of the new lens. It is thus seen that the sleeve 24 of the new lens will rotate with the rotatable focusing sleeve 11. The sleeve 24 of the new lens is provided with a screw-threaded engagement 25 which carries the lens mount 26 of the new lens. This lens mount 26 is held against rotation by a pin 27 extending into a slot 28 provided in the objective mount proper 26. The pin 27 is carried by a projecting arm 29 which is rigidly secured to the camera body in some suitable manner. With this arrangement it will be seen that rotation of the sleeve 11 will, through the screw-thread coupling 25, move the new objective axially proportionally to the pitch of the threads 25, which pitch will have been made previously to correspond to the focal length of the objective. Rotation of the focusing sleeve 11 will also impart axial movement to the mirrors 14 and 15, as above described, so as to adjust the range finder in accordance with the focusing adjustment of the objective. Since the screw mounted coupling 25 in each interchangeable objective has a pitch corresponding to the focal length of the objective, the movement of the focusing sleeve 11 through a predetermined angle will always impart the same axial movement to the range finder mirrors 14 and 15, and will impart to the objective an axial movement in an amount corresponding exactly to the focal length of the objective.

Figure 3:
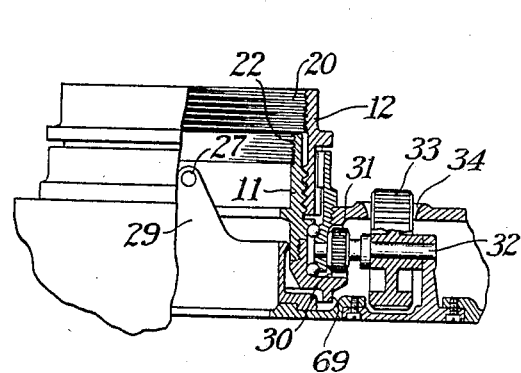
Fig. 3 is a detail plan view partly in section showing the focusing mechanism when a normal lens is employed.

The ring member 21, which is employed for securing the objective mount 24 to the rotatable focusing sleeve 11, may be used as the focusing ring, since it is secured to and moves with the rotatable focusing sleeve 11. I prefer, however, to provide an auxiliary means for imparting the rotatable movement to the focusing sleeve 11, and one suitable arrangement is shown in detail in Fig. 3. The rear end of the focusing sleeve 11 is provided with an up-turned portion having on its forward face gear teeth 30 which mesh with a small gear 31 carried on a shaft 32, suitably journaled in parts rigidly connected to the camera body. The shaft 32 is provided with a knurled wheel 33 having a portion of its periphery extending through a suitable opening 34 formed in the front wall of the camera 10. This knurled wheel may be readily rotated by the user, and such rotation is transmitted through the shaft 32, gears 31 and 30, to impart rotary movement to the focusing sleeve 11, which functions to focus the objective to shift the finder for parallax accommodation, and to move correspondingly the range finder mirrors 14 and 15, as fully described above. Some suitable means will of course be provided to limit the angular movement of the sleeve 11 to its predetermined range as is well known.

Figure 4:
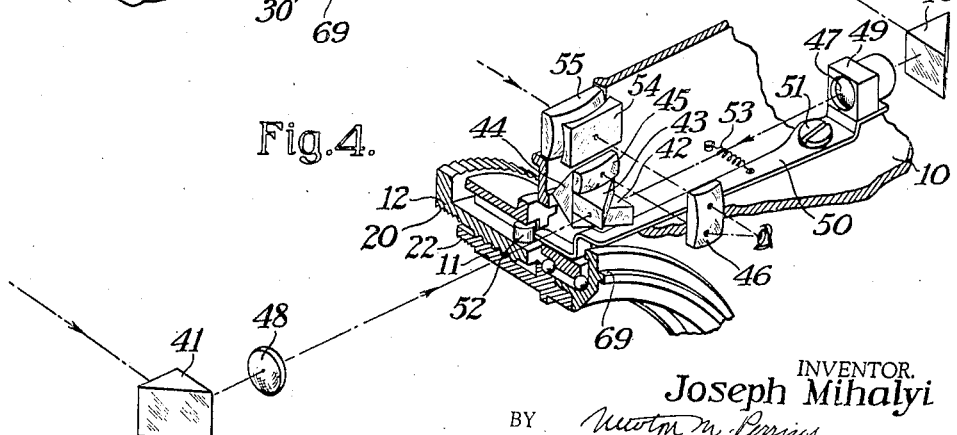
Fig. 4 is a partial view, in perspective, showing a focusing arrangement embodying my invention and employing a different type of range finder.

In Fig. 4 I show a modified form of the invention in which a telescopic range finder is employed. This range finder which provides a longer base line includes two end prisms 40 and 41 which collect the range finder beams and direct them along the base line to a beam combining and erecting system, comprising prisms 42, 43 and 44, which directs the combined beams rearwardly through lenses 45 and 46 to the eye of the observer. The lenses 45 and 46 form the ocular for the two telescopes, having objectives 47 and 48 which are positioned, respectively, in the two range finder beams prior to their being combined by the prisms 42 and 43. As is well known, one of the end prisms 40 and 41, or one of the objectives, such as the objective 47, is made movable for bringing the range finder images into coincidence. The movable objective lens 47 is carried by a mount 49 secured to one end of a lever 50 which is pivotally mounted to the camera body 10 by means of a screw 51. The other end of the lever 50 is bent to engage a pin 52 carried by the axially movable, but non-rotatable member, 12 to which the normal camera lens is secured, by means of the threads 20, as described in connection with Fig. 1. The lever 50 is held in engagement with the pin 52 by suitable resilient means such as a tension spring 53.

With this arrangement, when the focusing sleeve 11 is rotated as above described, it imparts an axial movement to the member 12 corresponding to its angular movement, and the axial movement of the member 12 is translated, through the pin 52 carried thereby and the pivoted lever 50, into movement of the telescope objective 47 transversely of one of the range finder beams. It will be evident that since the movement of the range finder element 47 corresponds exactly to the axial movement of the member 12, the arrangement just described will also function properly for interchangeable lenses mounted in the threads 22 in the same manner as the arrangement described in connection with Fig. 1.

In the arrangement shown in Fig. 4, the view finder is positioned above and its axis is perpendicular to the base line of the range finder. The range finder lens 46 is utilized also as the eye lens for the view finder which has a negative field lens 54 and a front positive lens 55 to provide for variable power as described in connection with Fig. 1. With this arrangement the fields of the view finder and the range finder are vertically adjacent and visible through a single observation opening. Although in order not to obscure other details I have not shown in Fig. 4 a mechanism for shifting the front finder lens 55 to accommodate for parallax it is to be understood that an arrangement such as shown in Fig. 1 may be provided for this purpose.

In both of the embodiments of my invention which have been described above, a predetermined angular movement of the rotatable focusing sleeve always results in a fixed axial movement of the part employed to actuate the movable member of the range finder, and when the normal camera lens is employed, its axial movement in focusing is the same as that of the part employed for actuating the range finder.

It will also be evident that by means of my arrangement, lenses differing in focal length may be accommodated when each interchangeable lens mount contains within itself a suitable coupling between the part interlocking with the rotatable focusing sleeve on the camera and its objective mount proper, so that by a suitable arrangement for preventing rotation of the objective mount proper, the objective will be moved axially upon rotation of the main focusing sleeve. This coupling in each interchangeable objective, may be an internal screw-threaded coupling provided with a pitch corresponding to the focal length of the objective, so that movement of the focusing sleeve through a predetermined angle will impart an axial movement to the objective corresponding to its focal length, a predetermined axial movement to the part employed for actuating the movable part of the range finder, and a predetermined parallax accommodating adjustment in the view finder.

What I claim as new and desire to secure by Letters Patent of the United States, is:

1. In a photographic camera, a rotatable sleeve journalled in the camera, a non-rotatable member mounted in screw threaded engagement with said sleeve, a range finder carried by the camera and including a movable optical member adapted to be moved in strict accordance with the axial movement of the non-rotatable member when said sleeve is rotated, an objective mounting detachably secured to the rotatable sleeve, said objective mounting comprising two parts connected by a screw threaded coupling, one part being adapted to interlock with the rotatable sleeve and the other part containing the objective, and means for restraining rotation of said part containing the objective, whereby angular movement of the rotatable sleeve imparts axial movement to the objective in accordance with the pitch of said screw threaded coupling.

2. In a photographic camera adapted to use interchangeable objectives of different focal lengths which objectives are carried in mounts comprising two relatively movable parts and each of which is provided with coupling means between its two parts corresponding to the focal length of its particular objective, a focusing sleeve rotatably supported on the camera, a range finder including a movable optical member, linking means between said movable optical member and said sleeve for actuating said member in strict accordance with the angular movement of said sleeve, means on said sleeve adapted for interlocking engagement with one of the parts of the mounts of the interchangeable objectives, and means carried by the camera adapted to cooperate with the other of the parts of said mounts to hold it in a fixed angular position when secured to the camera.

JOSEPH MIHALYI.